July 14, 1970      F. KALWAITES      3,520,458
APPARATUS FOR SPLITTING ORIENTED PLASTIC MATERIALS INTO
FIBROUS STRUCTURES
Filed March 5, 1968
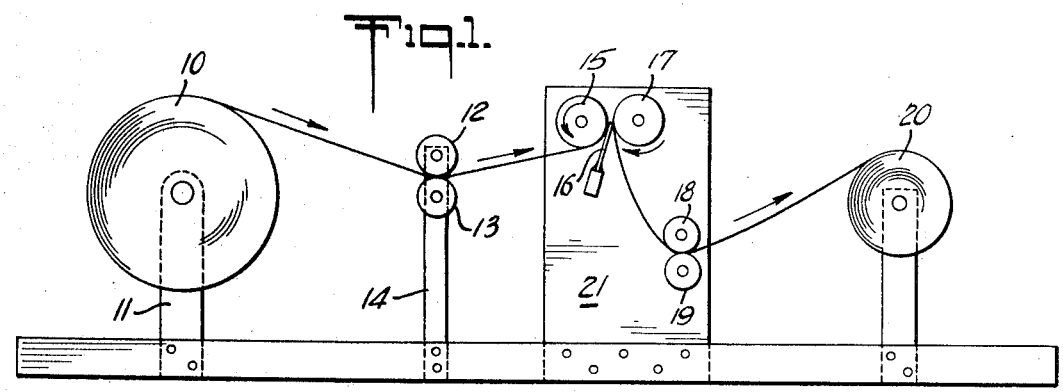
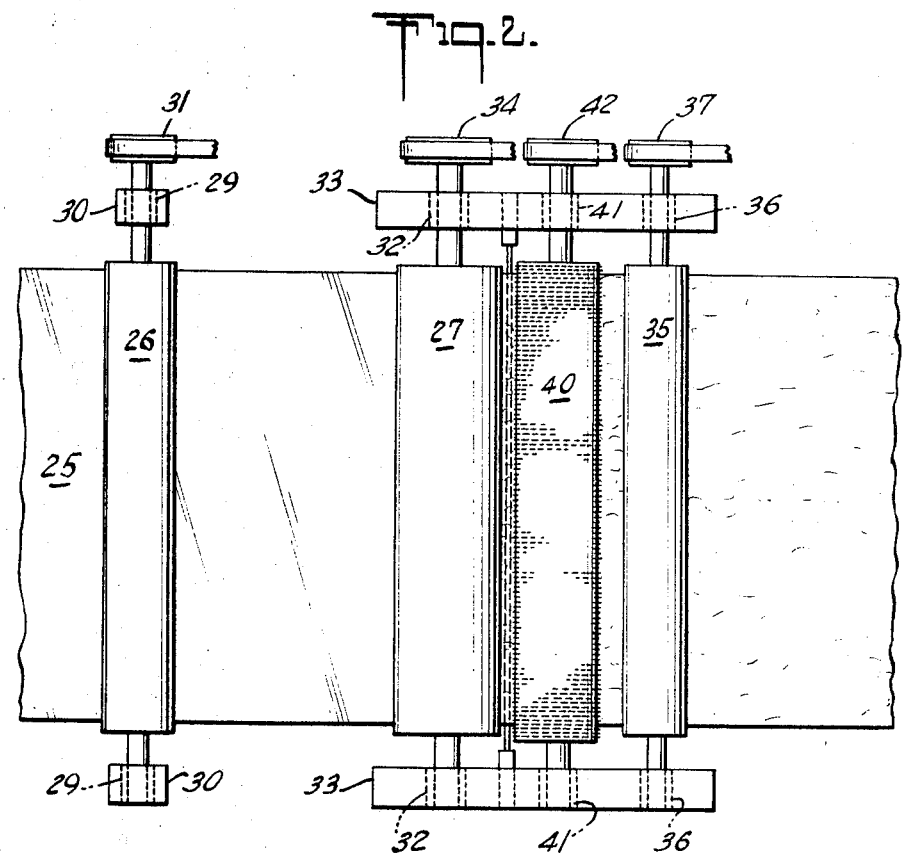
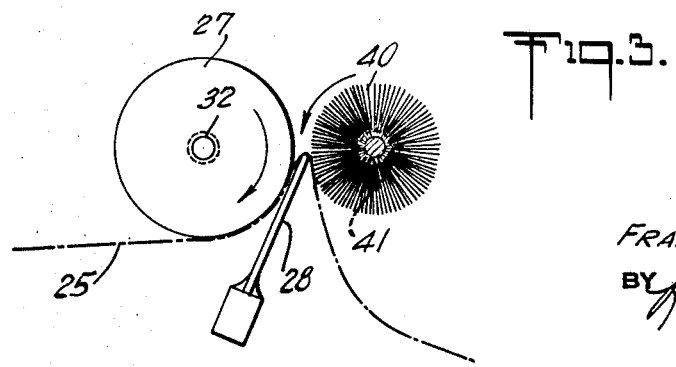
INVENTOR
FRANK KALWAITES
BY
ATTORNEY `United States Patent Office`

3,520,458
Patented July 14, 1970

3,520,458
APPARATUS FOR SPLITTING ORIENTED PLASTIC MATERIALS INTO FIBROUS STRUCTURES
Frank Kalwaites, Somerville, N.J., assignor to Johnson & Johnson, a corporation of New Jersey
Filed Mar. 5, 1968, Ser. No. 710,532
Int. Cl. B26f 3/02
U.S. Cl. 225—98                                        6 Claims

ABSTRACT OF THE DISCLOSURE

This is a method and apparatus for splitting oriented plastic sheet materials such as films, ribbons, etc. into fibrous structures. The material to be split is moved in a first direction. The direction in which the material is moving is changed so that the second direction makes an acute angle with the first direction. Simultaneously with the change in direction or movement of the material a plurality of disruptive forces are applied to the material substantially in the direction of the movement of the material to split the oriented material into a fibrous structure.

---

This invention relates to method and apparatus for splitting oriented plastic materials to form fibrous materials. Materials which may be treated in accordance with the present invention are sheet materials such as films, narrow tapes, etc. All of the starting materials are highly oriented in one direction (i.e., unilaterally oriented) to a sufficient degree so that forces will disrupt the material and split it into a fiber network. This is generally termed a fiber producing orientation and is a high degree of parallel orientation in one direction with very little strength to the film in the direction perpendicular to the direction of orientation.

It has been known for some time that fibrous sheets or split fiber webs may be produced by orienting plastic materials to a fiber producing orientation and then applying forces to disrupt the material and split it into a fibrous network. I have developed an improved method and apparatus for uniformly and completely splitting oriented plastic material into fibrous networks. My apparatus is very simple and may be operated at virtually any speed.

In accordance with the present invention plastic sheet material which is oriented to a fiber producing orientation is moved in a first direction. The direction in which the sheet material is moving is changed to a second direction making an acute angle to the first direction. Substantially simultaneously with the change in direction a plurality of disruptive forces are applied to the material to split the oriented plastic material into a fibrous network.

The apparatus for carrying the method of the present invention into practice comprises a rotatable roll having a stationary blade in tangential contact with the surface of the roll along a line parallel to the axis of the roll. The oriented plastic material passes between the roll and the blade and about the edge of the blade. Immediately adjacent the edge of the blade and rotating in the same direction as the first roll is a rotating brush roll so that the material moves about the edge of the blade and simultaneously the brush roll places disruptive forces substantially in the longitudinal direction of the material as the material passes about the blade. Preferably the rotatable brush roll rotates at a faster peripheral linear speed than the speed of the material being treated.

The invention will be more fully described in conjunction with the accompanying drawings wherein:

FIG. 1 is a side elevation view of one form of apparatus for carrying out the method of the present invention;

FIG. 2 is a top view of the splitting mechanism for carrying out the method of the present invention;

FIG. 3 is an enlarged cross-sectional view of the splitting mechanism of FIG. 2.

Referring to FIG. 1 a roll of plastic film 10 which has been oriented to a fiber producing orientation is mounted for rotation in suitable framing 11. The plastic material may be any of the standard orientable plastic materials such as the polyolefins; that is, polyethylene and polypropylene. Other plastic materials such as polyamides or polyesters may be used. The important thing is that the plastic material be oriented in one direction to an extent that it readily forms fibers as is well known in the art.

The plastic material is then passed through a pair of guide rolls 12 and 13 mounted for rotation in suitable framing 14. These rolls may be driven or may merely idle if subsequent rolls are driven. If rolls are driven it is preferred they have a roughened surface to provide a better grip and more uniform feed of the material.

The plastic material passes between the nip formed by a rotatable roll 15 mounted for rotation in suitable framing 21 and a stationary blade 16 also mounted in the framing 21 with the stationary blade in tangential contact with the rotatable roll. This rotatable roll may have a slightly roughened surface such as a sandblasted, knurled, or even a fluted or grooved surface. The roll may be made from any of the relatively hard metals or even a very hard rubber. The blade is preferably a tempered steel blade which has some resiliency to allow the material to pass between the blade and the roll. Preferably the blade extends slightly pass the tangent line of contact with the roll though it may terminate exactly at the contact line. The edge of the blade is preferably rounded so as not to rip or tear the material.

As the plastic material passes about the blade it is contacted with a rotating brush 17. The brush preferably rotates in the same direction as the film or plastic material is moving and at a higher peripheral linear speed than the linear speed of the plastic material. This movement is indicated by the appropriate arrows. The plastic material passes through a second set of guide rolls 18 and 19 mounted for rotation in the framing 21 and is wound up on standard wind-up mechanisms 20.

Referring to FIGS. 2 and 3 the oriented plastic material 25 from the guide roll 26 passes about a portion of the surface of the rotatable roll 27 and between this roll and the stationary blade 28 which is in tangential contact with the surface of the roll and extends slightly pass the point of tangential contact.

The guide roll is mounted for rotation in bearings 29 mounted in suitable framing 30 and is driven by means of a suitable motor and pulley 31. The rotatable roll is also mounted for rotation in bearings 32 mounted in suitable framing 33 and is driven by standard means 34. The plastic material after passing about the blade is then carried away by a second pair of guide rolls 35 mounted for rotation in bearings 36 mounted in the frame 33. These rolls may also be driven by standard means 37. The rotatable roll rotates in the direction of the arrow as shown in FIG. 3 so that it is moving in the same direction as the plastic material is moving. Positioned immediately adjacent the nip blade is a rotatable brushing roll 40. The brush roll is mounted for rotation in bearings 41 mounted in the frame 33 and rotates in the direction of the arrow as shown in FIG. 3. The brush roll is driven by standard means 42 or suitable gears. The brush roll preferably rotates at a faster peripheral linear speed than the speed of the plastic material. Speeds half again as fast of the speed of the plastic material or even 2 to 5 times the speed of the plastic material have been found satisfactory.

It is important that the bristles on the brushing roll which applies the forces to the plastic material to split it be sufficiently resilient so as not to tear the film but not too resilient so that they have no action on the film. It has been found that the bristles should have a length of at least ¼ inch and preferably ⅜ inch and a diameter of at least .014 inch. The bristles should be made of a relatively stiff material such as metal wires. Soft nylon bristles or similar softer bristles will not work in accordance with the present invention. The number of bristles may vary from about 100 per square inch to 200 per square inch or even higher as desired.

The oriented plastic material on being passed about the edge of the nip blade to change its direction at an acute angle and being simultaneously brushed to have disruptive forces placed over the material is broken into a network of split fibers.

Although all of the various holders, pulleys, belts, or like mechanical means including some framing have not been illustrated completely in the drawings or described in the specification it is to be appreciated that such elements have been omitted to keep the drawings and descriptions distinct and to avoid introduction of matters which are well known expedients in the art. The mechanical driving means and various frames which are used are conventional and merely involve the application of well known principles.

The invention will be further illustrated in greater detail by the following specific examples:

EXAMPLE I

A polyethylene film 2 mils in thickness and about 15 inches wide, highly oriented in the longitudinal direction of the film is passed through the apparatus depicted in FIG. 3. The input roll is a metal roll with a knurled surface in a diamond pattern. The brush roll has wire bristles having .018 inch diameter, being ⅜ inch long and containing approximately 100 bristles per square inch. A spring steel blade having a thickness of about .020 inch and rounded on its end is placed in contact with the input roll. The film is passed through the blade and roll and is brushed by the brush roll at a speed of about .10 feet per minute and the oriented film is split into a split fiber web of interconnected fibrous elements. The splitting is uniform throughout the entire area of the film.

EXAMPLE II

A polypropylene film 1.2 mils in thickness and about 15 inches wide and highly oriented (draw ratio 9:1) in the cross direction, that is the width, is fed to the apparatus depicted in FIG. 3. The input roll is a metal roll with a sandblasted surface. The brush roll has bristles .014 inch in diameter which are wire and are ⅜ inch long and has approximately 180 bristles per square inch. The roll and the brush roll rotate in the direction as shown by the arrows in FIG. 3 and the brush roll rotates at four times the speed of the metal roll. A spring steel blade having a thickness of .020 inch and rounded at its outer edge is placed in contact with the surface of the input roll. The film is passed through the blade and pair of rolls at a speed of 9 feet per minute and the oriented film is split into a split fiber web of interconnected fibrous elements. The splitting is uniform throughout the entire area of the film.

Though the apparatus and method have been more fully described with regard to operation on a plastic material which is oriented in the long direction it will work equally well as shown by the examples on plastic materials oriented in the cross direction. The important thing being to apply the disruptive force which is quite randomly applied by the brush roll over the entire surface of the material substantially at the same time that the material is bent at an acute angle to itself to produce the greatly improved, uniform splitting of the oriented plastic material.

Although several specific examples of the inventive concept have been described for purposes of illustration the invention should not be construed as limited thereby nor to the specific features mentioned therein except as the same may be included in the claims as appended hereto. It is understood that changes, modifications, and variations may be made in the method and apparatus herein described without departing from the spirit and scope of the claimed invention.

I claim:

1. Apparatus for treating oriented plastic material to produce a split fiber web comprising; a first rotatable roll, means for driving said roll, a stationary nip blade in tangential contact with the surface of the roll along a line substantially parallel to the axis of the roll and a rotatable brush roll positioned immedaitely adjacent the end of the nip blade and rotating in the same direction as said first rotatable roll for applying disruptive forces to the oriented plastic material as it passes about the edge of said nip blade.

2. Apparatus according to claim 1 wherein the first rotatable roll has a knurled surface.

3. Apparatus according to claim 1 wherein the first rotatable roll has a grooved surface.

4. Apparatus according to claim 1 wherein the brush roll has wire bristles having a diameter of from about .014 inch and a length of at least ¼ inch.

5. Apparatus according to claim 1 wherein the brush roll rotates at a peripheral linear speed at least twice the peripheral linear speed of the first rotatable roll.

6. Apparatus according to claim 1 wherein the first rotatable roll has a knurled surface, the brush roll has wire bristles having a diameter of from about .014 inch to .018 inch and a length of at least ¼ inch and the brush roll rotates at a peripheral linear speed at least twice the peripheral linear speed of the first rotatable roll.

References Cited

UNITED STATES PATENTS 3,112,160  11/1963  Rush _____ 28—10 XR

JAMES M. MEISTER, Primary Examiner

U.S. Cl. X.R.

225—3